United States Patent [19]

Gotoh et al.

[11] Patent Number: 5,158,006
[45] Date of Patent: Oct. 27, 1992

[54] BRAKE BOOSTER

[75] Inventors: Hiroya Gotoh; Tohru Satoh, both of Saitama, Japan

[73] Assignee: Jidosha Kiki Co., Ltd., Tokyo, Japan

[21] Appl. No.: 696,504

[22] Filed: May 7, 1991

[30] Foreign Application Priority Data

Jun. 5, 1990 [JP] Japan .............. 2-59331[U]
Jun. 12, 1990 [JP] Japan .............. 2-61777[U]

[51] Int. Cl.$^5$ .......................... F01B 29/00; F15B 9/10
[52] U.S. Cl. .......................................... 92/161; 92/48; 92/98 R; 91/369.2; 91/376 R
[58] Field of Search ............ 91/369.1, 369.2, 376 R; 92/48, 96, 97, 98 R, 161

[56] References Cited

U.S. PATENT DOCUMENTS

| | | | |
|---|---|---|---|
| 3,688,647 | 9/1972 | Kytta | 91/376 R |
| 4,348,944 | 9/1982 | Ochiai | 91/376 R |
| 4,534,270 | 8/1985 | Nishii | 91/369.2 |
| 4,633,757 | 1/1987 | Kubota | 91/369.2 |
| 4,689,958 | 9/1987 | Arino et al. | 60/547.1 |
| 4,726,189 | 2/1988 | Arino et al. | 60/547.1 |
| 4,756,232 | 7/1988 | Thioux et al. | 91/369.2 |
| 4,813,337 | 3/1989 | Endo | 91/369.2 |
| 5,063,830 | 11/1991 | Konishi | 91/376 R |

Primary Examiner—Thomas E. Denion
Assistant Examiner—Hoang Nguyen
Attorney, Agent, or Firm—Flynn, Thiel, Boutell & Tanis

[57] ABSTRACT

A brake booster is disclosed. More specifically, an improvement relating to a reinforcing plate which is used to reinforce a shell to which a master cylinder is connected is disclosed. The reinforcing plate comprises a pair of members, i.e. a first reinforcing plate which is disposed along the inner surface of the shell which provides a mounting surface for a master cylinder, and a second reinforcing plate which is disposed along the inner surface of the shell at a location radially outward of the mounting surface for the master cylinder. The rigidity of the shell can be increased without increasing a sheet thickness thereof.

6 Claims, 4 Drawing Sheets

BRAKE BOOSTER

FIELD OF THE INVENTION

The invention relates to a brake booster, and more particularly, to an improvement of a reinforcing plate for a shell including a mounting surface for a master cylinder.

DESCRIPTION OF THE PRIOR ART

A brake booster is known in the art including a shell having a front wall surface in which a rearwardly bulging recess is formed and having the end face of the recess formed as a mounting surface which is designed for connection with a master cylinder. The booster also includes a reinforcing plate which extends along the inside of the front wall surface to reinforce it.

In a conventional brake booster of the kind described, the reinforcing plate comprises a single member which conforms to the configuration of the inner surface of the shell so that the reinforcing plate may be disposed in overlapping relationship with the mounting surface of the shell and a radially outer portion thereof. Under this condition, the reinforcing plate and the mounting surface of the shell are connected to a master cylinder by means of mounting bolts.

When the brake booster is operated after the master cylinder is connected with the shell of the brake booster in a manner as mentioned above, internal stresses will be concentrated in the region of the mounting surface of the shell which is connected to the master cylinder and its radially outer portion. In the conventional brake booster in which the reinforcing plate comprises a single member, a difficulty has been experienced in providing a satisfactory reinforcement of both the mounting surface and the radially outer portion of the shell where the internal stresses are concentrated.

On the other hand, if the reinforcing plate is spot-welded circumferentially to the mounting surface and the radially outer portion of the shell in order to provide a reinforcement of the shell, stresses which are developed during the welding operation remain within the shell, disadvantageously causing an insufficient rigidity of the shell.

While a sufficient rigidity can be obtained by increasing the sheet thickness of the shell without performing the welding operation, this also increases the weight of the brake booster, which is disadvantageous.

SUMMARY OF THE INVENTION

In view of the foregoing, the invention relates to a brake booster including a shell having a front wall surface in which a rearwardly bulging recess is formed, with the end face of the recess being formed as a mounting surface which is designed for connection with the master cylinder, and a reinforcing plate extending along the inner surface of the front wall of the shell to reinforce it. In accordance with the invention, the reinforcing plate comprises a first reinforcing plate which extends along the inner surface of the shell which provides the mounting surface for the master cylinder, and a second reinforcing plate which extends along the inner surface of the shell at a location radially outward of the mounting surface.

With this arrangement, a sufficient rigidity of the mounting surface of the shell can be assured by the provision of the first reinforcing plate while the second reinforcing plate is effective to assure a sufficient reinforcement of the portion of the shell which is located radially outward of the mounting surface. In this manner, the rigidity of the shell can be increased without increasing a sheet thickness of the shell.

Above and other objects, features and advantages of the invention will become apparent from the following description of several embodiments thereof with reference to the attached drawings.

DETAILED DESCRIPTION OF EMBODIMENTS

Figure 1:
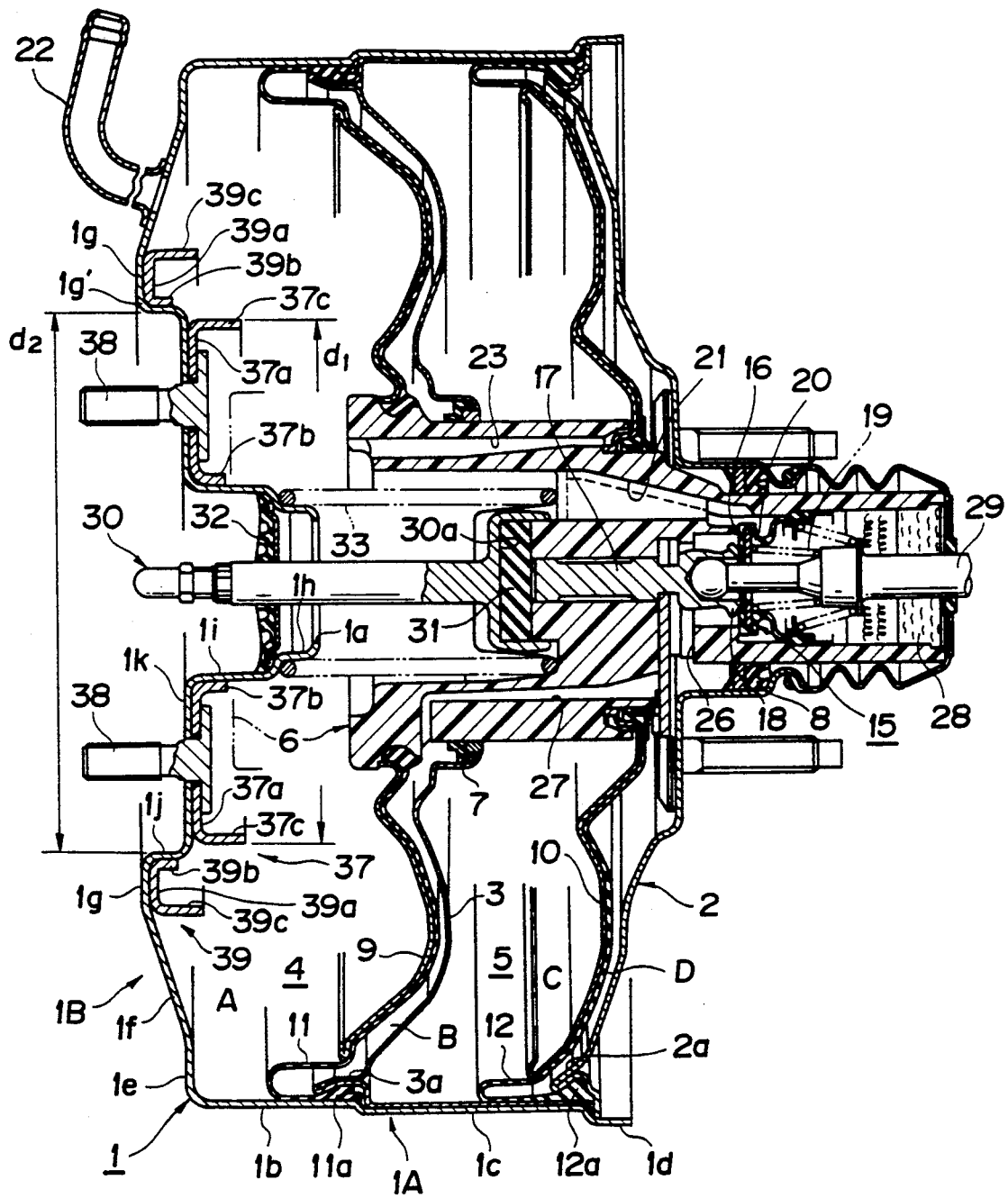
FIG. 1 is a longitudinal section of one embodiment of the invention.

Referring to the drawings, several embodiments of the invention will now be described. Initially referring to FIG. 1, an enclosed vessel is defined by a front shell 1 and a rear shell 2, and a center plate 3 is centrally disposed within the vessel to divide the interior into a front chamber 4 and a rear chamber 5 located thereacross. A substantially cylindrical valve body 6 slidably extends through axial portions of the rear shell 2 and the center plate 3 and is hermetically sealed thereto by annular seal members 7 and 8.

A front power piston 9 and a rear power piston 10 are disposed in the front chamber 4 and the rear chamber 5, respectively, and they are both connected to the valve body 6. Front and rear diaphragms 11, 12 are applied to the back surfaces of the power pistons 9, 10, respectively, thus defining a constant pressure chamber A and a variable pressure chamber B across the front diaphragm 11 and also defining a constant pressure chamber C and a variable pressure chamber D across the rear diaphragm 12.

A valve mechanism 15 disposed within the valve body 6 operates to switch a fluid circuit between the pair of constant pressure chambers A, C and the pair of variable pressure chambers B, D. Specifically, the valve mechanism 15 comprises an annular, first valve seat 16 formed on the valve body 6, an annular, second valve seat 18 formed on the right end of a valve plunger 17 which is slidably disposed within the valve body 6 at a location radially inward of the first valve seat 16, and a valve element 20 which is adapted to be seated upon either valve seat 16 or 18 from the right as viewed in FIG. 1, under the resilience of a spring 19.

A space disposed radially outward of an annular seat defined by the contact between the first valve seat 16 and the valve element 20 communicates with the constant pressure chamber A through an axially extending constant pressure passage 21 formed in the valve body 6, and the chamber A in turn communicates with an intake manfold, not shown, through a tubing 22 mounted on the front shell 1 for introducing a negative pressure. The chamber A also communicates with the constant pressure chamber C through a second, axially extending constant pressure passage 23 also formed in the valve body 6.

On the other hand, a space located radially inward of the annular seat defined by the contact between the first valve seat 16 and the valve element 20 and radially outward of another annular seat defined by the contact between the second valve seat 18 and the valve element 20, or located intermediate the both annular seats, communicates with the variable pressure chamber D through a radially extending variable pressure passage 26 formed in the valve body 6, and the chamber D in turn communicates with the variable pressure chamber B through another variable pressure passage 27 formed in the valve body 6.

Finally, a space located radially inward of the inner annular seat defined by the contact between the second valve seat 18 and the valve element 20 communicates with the atmosphere through a filter 28.

The valve plunger 17, which is slidably disposed within the valve body 6, has its right end connected to an input shaft 29 which is mechanically coupled to a brake pedal, not shown, while its left end is disposed in opposing relationship with the right end face of a reaction disc 31 disposed in a recess 30a which is formed at one end of a push rod 30. The left end of the push rod 30 slidably extends through an axial opening 1a of the front shell 1 to the outside thereof through a seal member 32, for connection with the piston of a master cylinder, not shown. The valve body 6 is normally maintained in its inoperative position shown by a return spring 33. The described construction is basically the same as a conventional brake booster of tandem type.

In the present embodiment, the front shell 1 comprises an outer cylindrical portion 1A which is disposed around the outer periphery thereof and having its diameter increased at a pair of steps as viewed from the front toward the rear side, and a front wall 1B which continues from the front end of the outer cylindrical portion 1A and having a mounting surface, which is designed for connection with the master cylinder, not shown, formed toward its axial portion.

The outer cylindrical portion 1A includes a smaller diameter portion 1b and an intermediate diameter portion 1c, and an outer bead 11a of the front diaphragm 11 is held between the inner cylindrical surface of the portion 1A and a cooperating portion 3a of the center plate 3 at the location of a boundary between the both portions 1b and 1c around the inner cylindrical surface. The center plate 3 also includes a rearwardly extending portion which extends beyond the cooperating portion 3a and which conforms to and is fitted into the inner cylindrical surface of the front shell 1 in overlapping relationship therewith, such rearwardly extending portion extending to a boundary between the intermediate diameter portion 1c and a larger diameter portion 1d. At the location of the boundary between the portions 1c and 1d, an outer bead 12a of the rear diaphragm 12 is held between the inner cylindrical surface of the center plate 3 which is disposed in overlapping relationship with the front shell 1 and a cooperating portion 2a of the rear shell 2. The rear shell 2 also includes a rearwardly extending portion which is fitted inside the portion 1d of the front shell 1, and both the front shell 1 and the rear shell 2 are integrally coupled together by caulking associated portions, not shown, together which are formed on the portion 1d at given circumferential positions.

The front wall 1B of the front shell 1 includes a flat surface portion 1e which is disposed nearest the outer periphery of the front shell 1 and which is formed by folding the front end of the smaller diameter portion 1b radially inward so as to extend in a direction perpendicular to the axis. Toward the axis, the flat surface portion 1e is followed by a frusto-conical portion 1f which is slanted at a given angle forwardly with respect to the surface portion 1e. The tubing 22 which is used to introduce a negative pressure is connected to the frusto-conical portion 1f at a given location.

Further toward the axis, the frusto-conical portion 1f is followed by a central flat surface portion 1g which extends in a plane perpendicular to the axis. The central flat surface 1g is then followed, furthermore toward the axis, by a stepped cylindrical portion which bulges rearwardly. The stepped cylindrical portion includes a series of diameters which sequentially decrease toward the rear side. The opening 1a initially mentioned is defined in the end of a smaller diameter portion 1h which is located in the rear end of the stepped cylindrical portion. A step is formed as a boundary between the smaller diameter portion 1h and an intermediate diameter portion 1i in the stepped cylindrical portion, and the seal member 32 is mounted across the inner cylindrical surface of the step and the output shaft 30.

In the present embodiment, a stepped end face 1k is formed between the intermediate diameter portion 1i and a larger diameter portion 1j in the stepped cylindrical portion, and is formed as a mounting surface which is designed for connection with a master cylinder. Accordingly, a first reinforcing plate 37, to be described later, is disposed in overlapping relationship with the inner surface of the stepped end face 1k, and under such condition, the stepped end face 1k and the first reinforcing plate 37 are connected to a master cylinder, not shown, by mounting bolts 38.

Furthermore, in accordance with the present embodiment, a second reinforcing plate 39 is disposed along the inner surface of the central flat surface portion 1g which is located radially outward of the stepped end face 1k. The pair of reinforcing plates 37 and 39 are effective to reinforce the stepped end face 1k, representing a mounting surface for the master cylinder, and the larger diameter portion 1j which continues from the end face 1k as well as the central flat surface portion 1g. In the present embodiment, the sheet thickness of the front shell 1 is uniform throughout its various portions.

The first reinforcing plate 37 is formed by an annular plate material so as to exhibit a flat end face 37a, the inner and the outer peripheral edge of which extends rearwardly through a given dimension, thereby forming an inner cylindrical portion 37b and an outer cylindrical portion 37c. The inner diameter of the inner cylindrical portion 37b is chosen to be substantially equal to the outer diameter of the intermediate diameter portion 1i of the front shell 1 while the outer diameter d1 of the outer cylindrical portion 37c is chosen to be less than the inner diameter d2 of the larger diameter portion 1j of the front shell 1.

When the first reinforcing plate 37 is constructed in this manner, the inner cylindrical portion 37b is fitted around the intermediate diameter portion 1i of the front shell 1, and the end face 37a is disposed in overlapping relationship with the inner surface of the stepped end face 1k of the front shell 1. Under this condition, the first reinforcing plate 37 and the stepped end face 1k (mounting surface) of the front shell 1 are caulked together by the mounting bolts 38 and connected to a master cylinder, not shown, by such bolts.

Since the outer diameter d1 of the outer cylindrical portion 37c of the first reinforcing plate 37 is chosen to be less than the inner diameter d2 of the larger diameter portion 1j of the front shell 1, the entire end face 37a of the first reinforcing plate 37 overlaps the inner surface of the stepped end face 1k (mounting surface) of the front shell 1 when the connection is completed, and accordingly, the outer cylindrical portion 37c of the first reinforcing plate 37 will be located opposite to the inner surface of the stepped end face 1k (mounting surface), at a location radially inward of the larger diameter portion 1j of the front shell 1.

When the stepped end face 1k (mounting surface) of the front shell 1 is connected to the master cylinder, a movement of the valve body 6 to its forward end of stroke as indicated by a phantom line will cause the valve body 6 to be axially overlapped with the outer cylindrical portion 37c of the first reinforcing plate 37. However, an axial dimension of the larger diameter portion 1j of the front shell is chosen such that an interference between the valve body 6 and the first reinforcing plate 37 is prevented if the valve body has moved to the forward end of its stroke in the manner mentioned above.

The second reinforcing plate 39 is constructed fundamentally in the same manner as the first reinforcing plate 37, and includes a flat end face 39a, an inner cylindrical portion 39b and an outer cylindrical portion 39c, and which extend rearwardly from the inner and the outer peripheral edge of the end face 39a.

The inner diameter of the inner cylindrical portion 39b is chosen to be substantially equal to the outer diameter of the larger diameter portion 1j of the front shell 1 while its axial dimension is chosen to be less than the axial dimension of the larger diameter portion 1j. The end face 39a of the second reinforcing plate 39 has a radial dimension which is equal to the radial dimension of the central flat surface portion 1g of the front shell 1. In addition, the axial dimension of the outer cylindrical portion 39c is chosen to be substantially equal to the radial dimension of the end face 39a (or the radial dimension of the central flat surface portion 1g).

The second reinforcing plate 39 is connected to the front shell 1 by fitting the inner cylindrical portion 39b as a press fit against the larger diameter portion 1j of the front shell 1 and disposing the end face 39a in overlapping relationship with the central flat surface portion 1g of the front shell 1. When they are connected together in the manner shown in FIG. 1, the rear end of the outer cylindrical portion 39c of the second reinforcing plate 39 will be located slightly rearward of the stepped end face 1k which provides a mounting surface for the master cylinder.

As described, in the present embodiment, the larger diameter portion 1j and the central flat surface portion 1g are formed between the stepped end face 1k which provides a mounting surface for the master cylinder and a frusto-conical portion 1f, whereby the rigidity of the front wall 1B can be improved over a conventional arrangement in which the front wall is simply formed by a mounting surface for the master cylinder and a corresponding frusto-conical portion.

The first reinforcing plate 37 is effective to reinforce the stepped end face 1k (mounting surface) of the front shell 1, and concurrently the second reinforcing plate 39 is effective to reinforce the larger diameter portion 1j and the central flat surface portion 1g of the front shell 1, which is effective to improve the rigidity of the stepped end face 1k (mounting surface), the larger diameter portion 1j and the central flat surface portion 1g of the front shell 1 when the first reinforcing plate 37 and the second reinforcing plate 39 are disposed therealong.

Accordingly, when the brake booster is operated after the brake booster has been connected to a master cylinder, any concentration of stresses in the region of the stepped end face 1k (mounting surface), the larger diameter portion 1j and the central flat surface portion 1g of the front shell 1 which are caused by forces transmitted through the mounting bolts 38 can be accommodated for by the first and the second reinforcing plate 37, 39.

Since the outer diameter d1 of the outer cylindrical portion 37c of the first reinforcing plate 37 is chosen to be less than the inner diameter d2 of the larger diameter portion 1j of the front shell 1, the entire end face 37a of the first reinforcing plate 37 can be disposed in overlapping relationship with the inside of the stepped end face 1k (mounting surface) of the front shell 1. Under this condition, the outer cylindrical portion 37c which extends along the outer peripheral edge of the end face 37a of the first reinforcing plate 37 can be located radially inward of the stepped end face 1k (mounting surface) of the front shell 1.

Accordingly, internal stresses which may be concentrated in the region of the stepped end face 1k (mounting surface), larger diameter portion 1j and central flat surface portion 1g of the front shell 1 may be efficiently distributed to the end face 37a and the outer cylindrical portion 37c of the first reinforcing plate 37 which is disposed along the inner surface of the stepped end face 1k (mounting surface), and this contributes to increasing the rigidity of the stepped end face 1k (mounting surface), larger diameter portion 1j and central flat surface portion 1g of the front shell 1 in a substantial manner.

Figure 2:
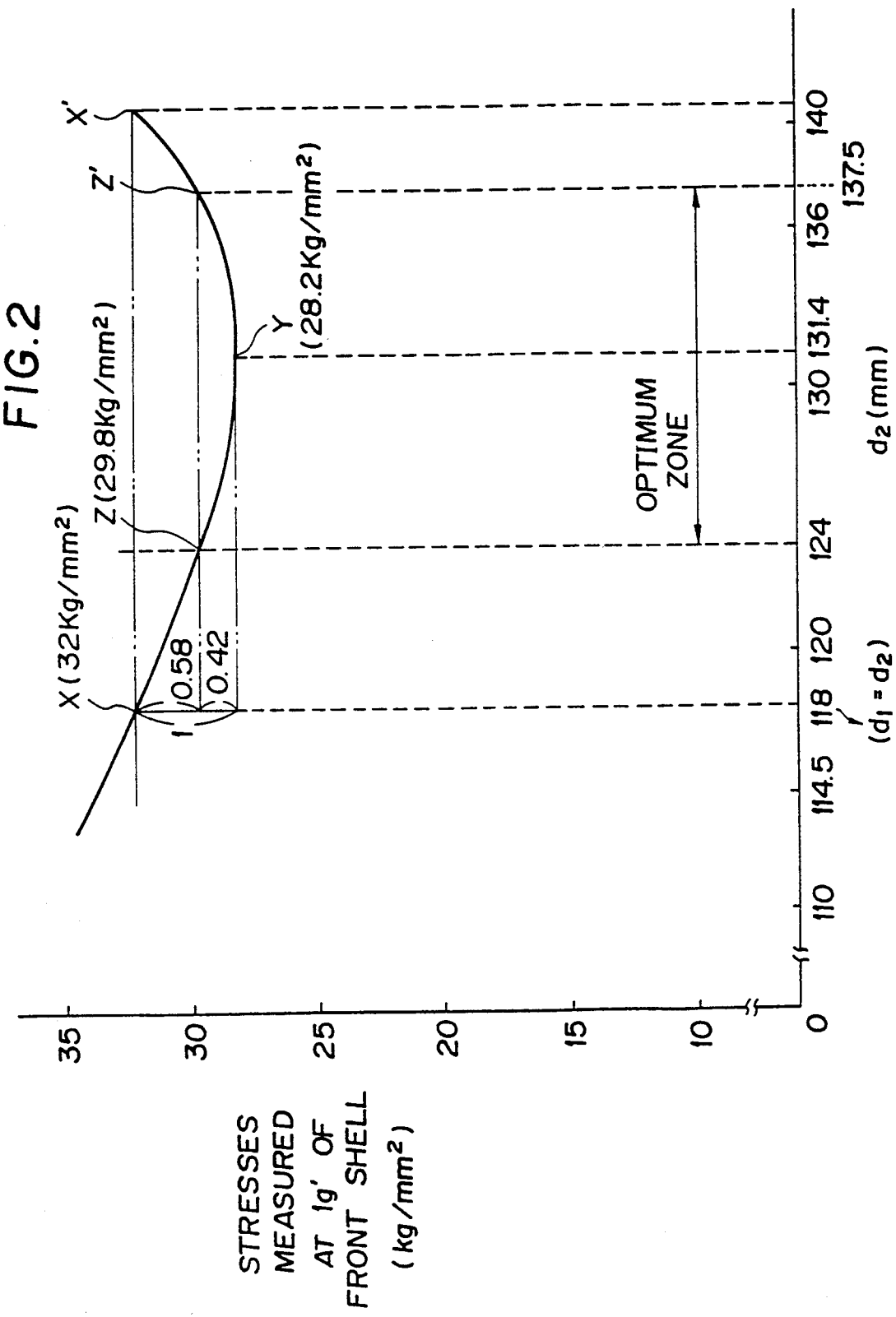
FIGS. 2 and 3 graphically shows experimental results obtained with the embodiment.

FIG. 2 graphically shows results of a measurement of internal stresses developed in the front shell 1 as a result of a forward drive transmitted from a master cylinder to the front shell 1 through the mounting bolts 38 when a master cylinder is connected to the stepped end face 1k (mounting surface) of the front shell 1 of the described embodiment by the mounting bolts 38 and the input shaft 29 is driven forward.

The results of measurement shown in FIG. 2 have been obtained under the conditions that a negative pressure of 500 mmHg is maintained in the constant pressure chambers A and C, an input load of 200 kg is applied to the input shaft 29 while an output load of 685 kg is delivered from the output shaft 30. During this experiment, the outer diameter d1 of the outer cylindrical portion 37c of the first reinforcing plate 37 is chosen equal to be 118 mm while the inner diameter d2 of the larger diameter portion 1j of the front shell 1 is varied from about 110 mm to about 140 mm while measuring internal stresses which are developed in a part 1g' of a boundary between the larger diameter portion 1j and the central flat surface portion 1g of the front shell 1. The part of the boundary 1g' is selected for measurement for the reason that internal stresses of maximum magnitudes are developed within the front shell 1 in this part 1g'.

In FIG. 2, the internal stress at the part 1g' when d2=118 mm or when d1=d2 as shown at point X is about 32 kg/mm$^2$, and such internal stress gradually decreases as the inner diameter d2 is increased beyond 118 mm until point Y is reached where the diameter d2 is equal to about 131 mm, yielding a minimum internal stress at the part 1g'. Subsequently, as the diameter d2 increases, the internal stresses measured at the part 1g' gradually increases in an almost same rate of decrease in the internal stresses which are measured from point X to point Y. When d2 is equal to about 140.5 mm as shown at point X', the internal stresses will be equal to about 32 kg/mm$^2$, a similar value as when d2=118 mm at point X.

It will be seen from the results of the experiment described above that the internal stresses developed at the part 1g' of the front shell 1 can be reduced by choosing a suitable value for d1 in an extent such that d1<d2 as compared with a corresponding internal stress obtained for d1≧d2. In other words, choosing the internal stresses at point X (or point X') developed in the part 1g' of the boundary between the larger diameter portion 1j and the central flat surface portion 1g of the front shell 1 when the outer diameter d1 of the outer cylindrical portion 37c is chosen equal to the inner diameter d2 of the larger diameter portion 1j of the front shell 1 as a reference, the internal stresses can be reduced by a choice of an outer diameter d1 less than the inner diameter d2 within an extent that the internal stresses developed in the part 1g' do not exceed the reference stress at point X, as compared for a reverse choice or d1≧d2. It is understood that a reduction in the internal stresses within such extent is attributable to an efficient dispersion of internal stresses developed within the front shell 1 to the outer cylindrical portion 37c of the first reinforcing plate 37.

It is desirable that a value for d1 be chosen in a range in which an internal stress which is on the order of 40% or less as compared with the internal stress obtained at the points X and X' be developed, or more specifically, in a range from 124 to 137.5 mm where the internal stress will be reduced to 42% or less in an example shown in FIG. 2. In the present embodiment, the experiment has been conducted choosing d1=118 mm, but it is recognized that a similar tendency applies for the choice of a different value for d1.

Figure 3:
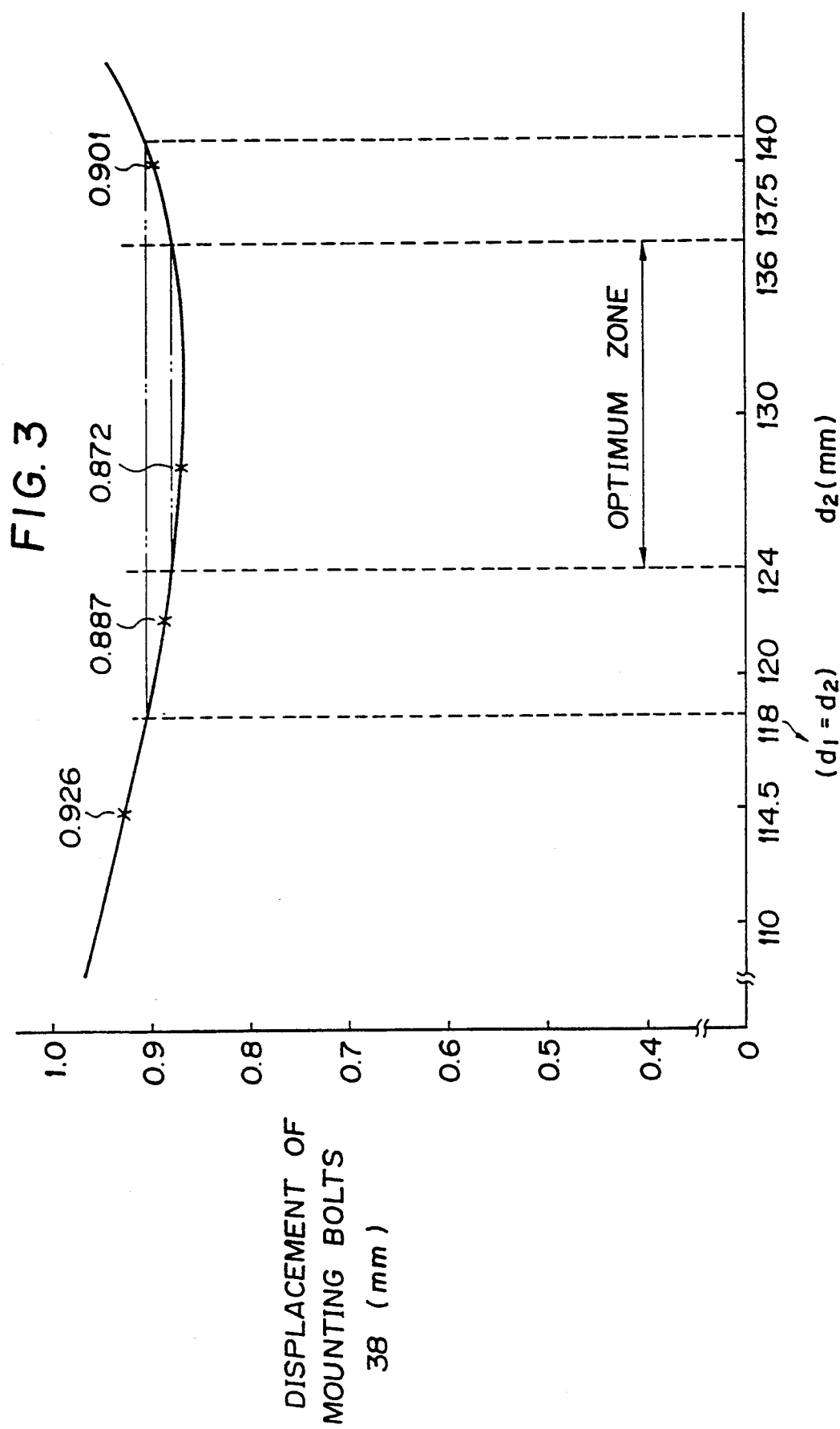

FIG. 3 graphically shows results of a measurement of an axial displacement of the mounting bolt 38 under the experimental condition mentioned above. It will be seen from FIG. 3 that a choice of value for d1 in the extent mentioned above reduces the displacement of the mounting bolt 38.

Figure 4:
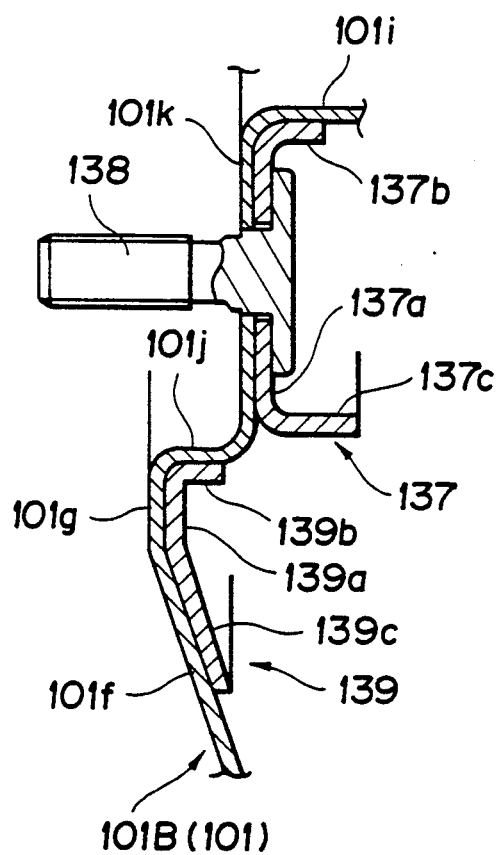
FIG. 4 is a fragmentary section of another embodiment of the invention.

FIG. 4 shows a second embodiment of the invention in which the profile of a second reinforcing plate 139 is chosen so as to conform to the profile of the front shell 101.

Specifically, a portion corresponding to the outer cylindrical portion 39c of the first embodiment is formed as a frusto-conical portion 139c having a diameter which increases toward the rear end in conformity to the configuration of the frusto-conical portion 101f of the front shell 101. It will be noted that not only an end face 136a, but also the frusto-conical portion 139c is also disposed in overlapping relationship with the inner surface of the front shell 101. In other respects, the arrangement is similar to that of the first embodiment, and accordingly will not be specifically described, noting that parts corresponding to those shown in connection with the first embodiment are designated by like reference numerals, to which 100 is added.

According to the second embodiment, not only the stepped end face (mounting surface) 101k, larger diameter portion 101j and central flat surface portion 101g, but also the frusto-conical portion 101f of the front shell 101 can be reinforced, further enhancing the rigidity of the front shell 1 as compared with the first embodiment.

While the embodiments illustrated are applications of the invention to a brake booster of tandem type, it should be understood that the invention is equally applicable to a brake booster of single type or triple type.

While the invention has been described above in connection with several embodiments thereof, it should be understood that a number of changes, modifications and substitutions therein will readily occur to one skilled in the art from the above disclosure without departing from the spirit and scope of the invention defined by the appended claims.

What is claimed is:

1. A brake booster including a shell having a front wall surface in which a rearwardly bulging recess is formed, with the end face of the recess being formed as a mounting surface designed for connection with a master cylinder, the front wall surface having an inner surface, and a reinforcing plate extending along the inner surface of the front wall surface of the shell to reinforce it, the reinforcing plate comprising a first reinforcing plate extending along the inner surface of the shell at the mounting surface for the master cylinder, namely at said rearwardly bulging recess, and a second reinforcing plate extending along the inner surface of the shell in a region which is radially outward of the mounting surface for the master cylinder, which region bulges forwardly from the mounting surface.

2. A brake booster including a shell having a front wall surface in which a rearwardly bulging recess is formed, with the end face of the recess being formed as a mounting surface designed for connection with a master cylinder, the front wall surface having an inner surface, and a reinforcing plate extending along the inner surface of the front wall surface of the shell to reinforce it, the reinforcing plate comprising a first reinforcing plate extending along the inner surface of the shell which provides the mounting surface for the master cylinder and a second reinforcing plate extending along the inner surface of the shell in a region radially outward of the mounting surface for the master cylinder, the first reinforcing plate comprising an end face having an outer peripheral edge, said end face being disposed in overlapping relationship with the inner surface of the mounting surface of the shell, the first reinforcing plate having an outer cylindrical portion which extends rearwardly from the outer peripheral edge of the end face of the first reinforcing plate, the first reinforcing plate having an outer diameter which is less than an inner diameter of a cylindrical portion defined by the recess in the shell.

3. A brake booster according to claim 2 in which the outer diameter of the outer cylindrical portion of the first reinforcing plate is chosen to a value which produces an internal stress less than the internal stress developed in the cylindrical portion of the shell when the outer diameter of the outer cylindrical portion is chosen equal to the inner diameter of the cylindrical portion defined by the recess in the shell.

4. A brake booster including a shell having a front wall surface in which a rearwardly bulging recess is formed, with the end face of the recess being formed as a mounting surface designed for connection with a master cylinder, the front wall surface having an inner surface, and a reinforcing plate extending along the inner surface of the front wall surface of the shell to reinforce it, the reinforcing plate comprising a first reinforcing plate extending along the inner surface of the shell which provides the mounting surface for the master cylinder and a second reinforcing plate extending along the inner surface of the shell in a region radially outward of the mounting surface for the master cylinder, the front wall surface of the shell including a flat surface located nearer the outer periphery of the shell and extended in a plane perpendicular to the axis of the shell, a frusto-conical portion which bulges forwardly, a central flat surface portion which extends in a plane perpendicular to the axis, a cylindrical, larger diameter portion which extends axially rearward, a stepped end face which is formed by folding the rear end of the larger diameter portion radially inward, and a cylindrical, smaller diameter portion extending axially rearward from the inner peripheral edge of the stepped end face, in the sequential order as viewed from the outer periphery toward the axis, the first reinforcing plate extending along the inner surface of the stepped end face and the second reinforcing plate extending along the inner surface of the central flat surface portion.

5. A brake booster according to claim 4 in which said second reinforcing plate has an end face in turn having an inner peripheral edge and an outer peripheral edge, the inner and outer peripheral edges of the end face of the second reinforcing plate being formed with an inner and an outer cylindrical portion, respectively, which are cylindrical in configuration and which extend axially rearward, the inner cylindrical portion of the second reinforcing plate being fitted around the larger diameter portion of the shell, the end face of the second reinforcing plate being disposed in overlapping relationship with the central flat surface portion of the shell.

6. A brake booster according to claim 4 in which the second reinforcing plate comprises an end face which is disposed in overlapping relationship with the inner surface of the central flat surface portion of the shell, an inner cylindrical portion formed around the inner peripheral edge of the end face of the second reinforcing plate and which is fitted around the larger diameter portion of the shell, and a frustoconical portion formed around the outer peripheral edge of the end face of the second reinforcing plate and which is disposed in overlapping relationship with the inner surface of the frustoconical portion of the shell.

* * * * *